June 9, 1959

J. L. DUNLAP 2,889,852

VALVE STRUCTURES

Filed March 11, 1957

INVENTOR.
James L. Dunlap
BY
A. Schapp
Att'y

2,889,852
VALVE STRUCTURES

James L. Dunlap, San Anselmo, Calif.

Application March 11, 1957, Serial No. 645,097

2 Claims. (Cl. 137—625.19)

The present invention relates to improvements in valve structures, and its principal object is to provide a valve structure adapted to feed fluid from several sources toward a common destination in separate paths and in desired proportions.

A further object of my invention is to provide a valve structure of the character described in which the proportionate feeding is maintained throughout the range of the valve openings.

A still further object of the present invention is to provide a valve structure of the character described which is sturdy, wear-resistant, adapted to various manufacturing processes for mixing various liquids or gases in desired proportions, and is rapid in action, so as to be particularly adapted for solenoid operation.

Further objects and advantages of my invention will appear as the specification proceeds, and the new and useful features of the valve structure will be fully defined in the claims attached hereto.

Figure 1:
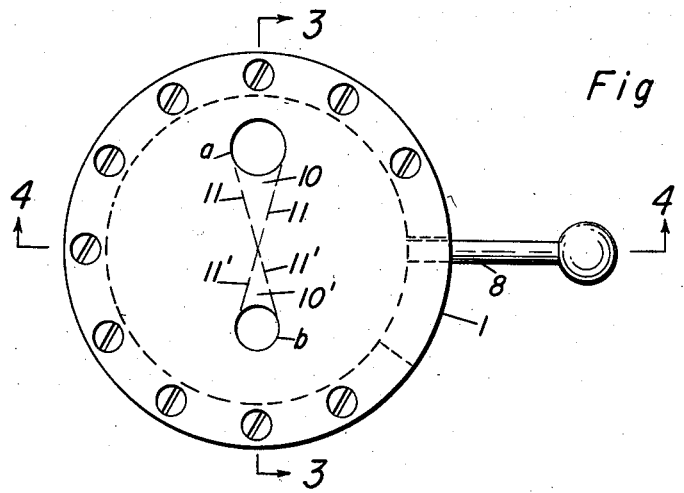
Figure 2:
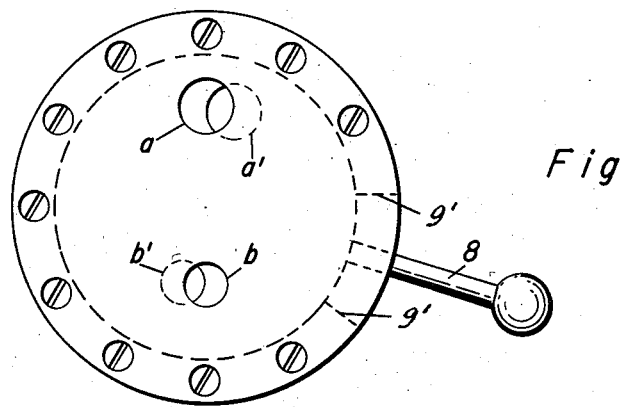
Figure 3:
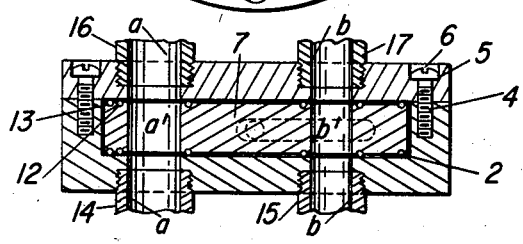

The preferred form of my invention is illustrated in the accompanying drawing forming part of this application, in which:

Figure 1 shows a top plan view of my valve structure, with the valve in fully open position;

Figure 2, a similar view with the valve in semi-open position;

Figure 3, a section taken along line 3—3 of Figure 1, and

Figure 4:
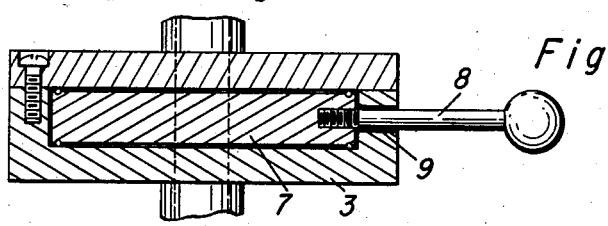

Figure 4, a section taken along line 4—4 of Figure 1.

While I have shown only the preferred form of my invention, it should be understood that various changes or modifications may be made within the scope of the claims attached hereto, without departing from the spirit of the invention.

Referring to the drawing in detail, my valve structure comprises a cylindrical housing 1 having a cylindrical chamber 2 formed therein.

The housing is preferably made in two parts, namely, a cylindrical base 3 having the chamber formed therein and a flat disc cap fitting on the rim of the base and secured thereto by means of an annular series of bolts 4, the heads 5 being preferably received in countersunk pockets 6.

The ends of the housing are formed with one or more pairs of registering ports marked $a$ and $b$, respectively, two pairs being shown for the purpose of the present invention, as being illustrative of the principle.

Any number of ports might be added, if dimensioned and located as hereinabove set forth.

My invention further comprises a cylindrical valve body 7 having a revolving fit in the cylindrical housing, and operable from the outside of the housing through a radial rod or handle 8, which extends from the valve body through a horizontal slot 9 in the cylindrical wall of the housing. The slot is limited in length, as at 9', to limit the handle movement.

The valve body 7 is formed with two ports $a'$ and $b'$ which register in size and position with the housing ports $a$ and $b$ when the handle 8 is in one end position, as shown in Figure 1.

When the handle is moved toward the other end position, the ports $a'$ and $b'$ move out of registry with the ports $a$ and $b$, but it will be noted, by reference to Figure 2, that in the two sets of cooperative ports, any opening movement of the valve body opens both sets proportionately, so that when two different gases or liquids are fed through the two sets of ports in desired proportions, the same proportions will be maintained whether the ports are fully open, as in Figure 1, or partly open, as in Figure 2.

And, this remains true, due to the positioning of the ports, regardless of their diameters, and regardless of the number of sets employed.

In Figure 1, for instance, the ports $a$ are shown as being considerably larger than the ports $b$, but it will be noted that the ports $a$ are confined to a sector-shaped area 10 defined by two radial lines 11, and that the diameters of the ports are such as to bring the radial lines in tangential relation to the ports at the point selected.

This brings the ports $a$ relatively close to the periphery of the cylindrical chamber and the corresponding ports $a'$ into similar relationship to the periphery of the valve body.

The ports $b$ are much smaller than the ports $a$, but are confined within a similar sector-shaped area 10' defined by radial line 11', and are moved closer to the axis of the housing, so as to bring the radial lines into tangential relation with respect to the ports. The corresponding port $b'$ of the valve body is, of course, similarly located.

It is apparent that this location of the ports with respect to the sector-shaped areas will cause the ports $a'$ and $b'$ of the valve body to enter upon the corresponding ports $a$ and $b$ of the housing exactly at the same time, will progressively open corresponding and proportionate port areas, and will finally open both ports $a$ and $b$ at the same time.

And, this will be true whether both sets of ports are located in the same sector-shaped area, or in opposite sector-shaped areas, as shown in the drawing.

It will also be true where more than two sets of ports are employed, in differently located sector-shaped areas, as long as the areas are of the same size and the radial lines defining the area maintain the same tangential relationship with respect to the ports.

It will be understood, of course, that the smaller the ports, the closer they will move toward the axis of the housing and the valve body.

The valve body is formed with two annular grooves 12 near its periphery and on opposite sides thereof, the grooves being made to carry O-rings 13, the upper and lower faces of which bear on opposite ends of the valve housing to prevent leakage past the O-rings.

Similar O-rings may be employed about the individual ports of the valve body.

The lower ports $a$ and $b$ of the housing are connected through conduits 14—15, to different sources of supply, and the corresponding upper ports $a$ and $b$ are connected to conduits 16—17 which latter may lead to a common destination for mixing purposes.

In operation:

Figure 1 shows both sets of valves $a$ and $a'$, and $b$ and $b'$ in full registry, with the handle 8 in one extreme end position.

In this position both valves are completely open and the liquid or gas is free to flow from the conduits 14—15 through the ports $a$ and $a'$ and $b$ and $b'$ into the conduits 16—17 for delivery to a common destination.

When the handle 8 is turned to a midway position, as in Figure 2 both valves are partly closed in exact proportion to one another, so that the liquid or gas fed from the conduits 14—15 will be fed in the same proportion as with the valves fully open.

As the handle is turned further, to the end of the slot, both valve ports $a'$ and $b'$ will simultaneously move out of registry with the cooperating ports $a$ and $b$, and both valves will close simultaneously.

I claim:

1. A valve structure adapted for proportionate feeding from two sources of fluid, comprising a housing having a cylindrical chamber therein, a cylindrical valve body having a revolving fit in said chamber and having means for rotating the same from outside the housing, the housing having two pairs of ports therein disposed in those end walls of the housing sandwiching the valve body therebetween with the ports of one pair registering with the ports of the other pair, the ports of each pair being of similar geometric shapes but of different sizes with the ports of each pair being identically oriented with respect to the axis of rotation of said valve body, the two ports of each pair being bounded between pairs of lines extending radially from the axis of rotation of said valve body in which the angles included between such pair of lines are equal, and said two ports of each pair being radially offset from the axis of rotation by different amounts such that the stated boundary lines touch similar boundary points of the two ports in each pair, and said valve body having two similarly located ports of sizes corresponding to the ports in the housing and registerable therewith in one position of the valve body within said housing.

2. The valve structure according to claim 1 wherein said ports are of circular shape with said radial lines being tangent to the corresponding supports which they bound.

References Cited in the file of this patent
UNITED STATES PATENTS

| | | |
|---|---|---|
| 1,495,870 | O'Donnell et al. | May 27, 1924 |
| 2,054,488 | Sink | Sept. 15, 1936 |
| 2,578,160 | Van Der Werf | Dec. 11, 1951 |